Patented Nov. 26, 1940

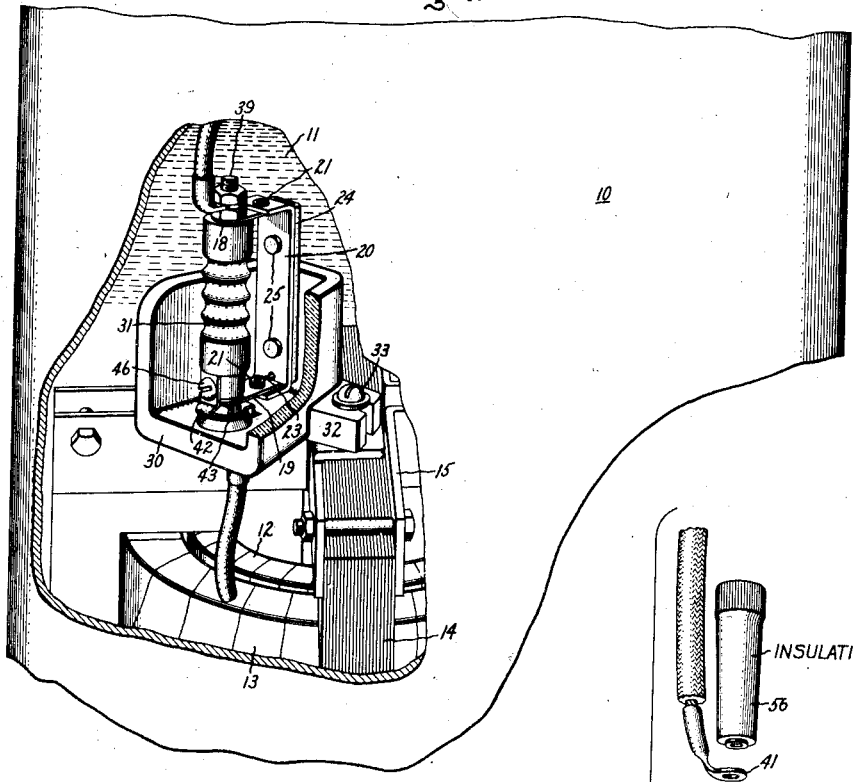

2,223,232

UNITED STATES PATENT OFFICE 2,223,232

FUSED PROTECTIVE DEVICE

Sidney R. Smith, Pittsfield, Mass., assignor to General Electric Company, a corporation of New York Application August 11, 1938, Serial No. 224,324

12 Claims. (Cl. 200—133)

The present invention relates to the protection of electric apparatus and has for a principal object the provision of an improved internal fused protective device and arrangement thereof for electric apparatus, such as transformers and the like, more particularly of the liquid insulation filled type.

For some transformer installations, it has been found that, with a suitable over-current protective device connected in the low voltage circuit, the transformer high voltage winding can be connected directly to the line without employment of the conventional primary fuse cutout. With this connection, however, failure of the transformer itself would be likely to short-circuit the line and cause extensive outages due to the blowing of sectionalizing fuses or station breakers. For this reason it has been found desirable, for such installations, to provide the transformer with an internal line-protective fuse device which will serve to clear the primary circuit in case of transformer failure. It has been proposed also, to employ such internal fuses for the protection of the transformers themselves from overloads and external faults.

It is therefore an object of the present invention to provide a satisfactory, efficient, and low cost fuse device and arrangement thereof which is particularly adapted for internal fusing of transformers but which may be employed to advantage also in other similar forms of electric apparatus where similar problems are encountered.

It is a further object of the invention to provide an improved fuse device and mounting therefor.

Other objects and the details of that which I believe to be novel and my invention will become apparent from the following description and the claims appended thereto, taken in conjunction with the accompanying drawing in which Fig. 1 illustrates an exemplary embodiment of my invention as applied to a transformer; Fig. 2 is a sectional elevation of the improved fuse device and mounting of Fig. 1; Fig. 3 shows, partially in sectional elevation, a modification of the fuse device and mounting, and Fig. 4 shows, in perspective, an exploded view of a further modification.

Although, as previously suggested, my invention may be employed in the protection of other forms of electric apparatus, such for example as capacitors, where similar problems may be encountered, I have elected for purposes of full and complete disclosure, to describe and illustrate my invention as embodied in a transformer. In Fig. 1 of the drawing, 10 designates a portion of the tank of an exemplary transformer, partially cut away to show the internal assembly. It will be understood of course that this tank is provided with bushings, terminals, and other customary equipment which however has not been illustrated since it has no bearing upon the present invention. The interior of the tank is filled, or substantially filled, with suitable insulating liquid 11, such as oil or a liquid halogenated hydrocarbon composition such as described in U. S. Patent 1,931,373 to F. M. Clark. Immersed in the insulating liquid is a transformer windings-and-core assembly comprising, in the exemplary form illustrated, a low voltage winding 12, a high voltage winding 13, core laminations 14, and a core clamping framework 15, the core structure of the assembly illustrated having four legs projecting outwardly at right angles to each other from a central point. Fuse devices of the present invention are particularly adapted to be supported within the transformer tank, submerged in the insulating liquid, and connected in series with the high voltage line leads. Although Fig. 1 shows only one of the fuse devices connected in one of the high voltage leads, a plurality of the devices may, if desired, be so connected where taps or series parallel connections are employed.

The device of Figs. 1 and 2 has a fuse element which consists of two flat metallic terminal strips 18, 19 which are fastened respectively to opposite ends of a U-shaped insulating strip 20 by means of metallic rivets 21. Terminal strips 18 and 19 are drilled as indicated at 22 for mounting purposes, as will be described hereinafter, and preferably are somewhat flexible. Insulating strip 20 is formed of any suitable insulation material but preferably is of a fibrous material so that it has some degree of flexibility. Strips 18, 19, and 20 form a U-shaped bracket for supporting a fusible conductor 23 and an open-ended expulsion tube 24, which tube is of insulation and is secured to the intermediate portion of the supporting bracket by means of rivets 25 so that the tube extends generally at right angles to the end portions, including terminal strips 18 and 19 of the bracket. Fusible conductor 23 extends relatively losely through tube 24 and is fastened at its ends respectively to rivets 21, as indicated at 26, so that the fusible conductor is electrically connected between terminal strips 18 and 19. It is preferable, in order to avoid any danger of corona discharge, that the fusible conductor, as it extends out of the opposite ends of tube 24, be led through small openings 27 in strip 20, and that the ends of the conductor be secured to rivets 21 on the interior side of the bracket.

The fuse element described in the preceding paragraph is supported in the transformer tank by means of an insulating supporting structure comprising in the main a terminal mount or "board" 30 and an insulating post 31 mounted thereon. Mount 30 is constructed of suitable insulating material, such as porcelain, and is somewhat cup-shaped in that it has a bottom wall and upwardly extending side walls arranged to form a compartment having an open top and front. Mounting feet 32 (one of which is shown in Fig. 1) are provided respectively on opposite sides of the mount for attachment respectively to the clamping frame of adjacent legs of the core structure by means of bolts, as indicated at 33, in such manner that the mount is conveniently supported above and intermediate said two adjacent legs of the core structure. The bottom wall of the mount carries an upright conducting terminal stud 34, the lower end of which projects below the mount for attachment thereto, in any suitable manner, as by means of nut 35, of a lead 36 from the high voltage winding 13.

Post 31, also constructed of suitable insulating material, such as porcelain, has metal inserts 37 and 38 respectively at opposite ends thereof and is detachably mounted at its lower end on terminal stud 34 by screw-threaded engagement of lower insert 38 with the screw-threaded upper end of stud 34. Upper insert 37 supports connection terminal stud 39 which is adapted to have connected thereto in any suitable manner, as by means of nut 40, the outgoing high voltage lead designated 41. In order to prevent turning of post 31 on terminal stud 34 there is provided a locking clip 42 which is clamped in place on stud 34 by means of a nut 43 and which has a portion 44 projecting into a recess 45 in the bottom wall of mount 30 to prevent turning of the clip. The other end of the clip is provided with a set screw 46 arranged for engagement with screw-threaded openings provided in insert 38.

In the assembly of the elements just described, the fuse supporting bracket is attached to insulating post 31 by engagement of terminal strip 18 with connection terminal stud 39. The lower end of post 31 is then mounted on stud 34, care being taken to maintain the opening 22 in lower terminal strip 19 in alinement with the opening in insert 38, and a springy cup-shaped washer 47 being inserted between strip 19 and insert 38. With the bracket projecting toward the rear wall of mount 30 and loose relative to post 31, the post is screwed down on stud 34 until terminal strip 19 is clamped firmly between spring washer 47 and nut 43 by means of insert 38, thus securing the bracket in proper position so that the fusible conductor and expulsion tube are adjacent the rear of the compartment in mount 30, as illustrated. Post 31 is then locked against turning by means of set screw 46, and upper terminal strip 18 is securely clamped to upper insert 37 by means of nut 48. With this arrangement, terminal strips 18 and 19 are in good electric conductive relation respectively with connection terminal stud 39 and supporting terminal stud 34 and electric connection of fusible conductor 23 between the two terminal studs is effected. As a final step, the lead 41 is attached to stud 39 and securely clamped in place by means of nut 40.

With the fuse element connected as above described, upon the occurrence of excess current, the fusible conductor 23 melts and an arc is formed in tube 24. The resultant expulsion action due to the pressure built up in the tube, and the action of the insulating liquid, effect a rapid extinction of the arc and interruption of the current flow. The conductor 23 is designed so as to have a fusible section of considerable length and of relatively low melting point material so that it burns away rapidly, thus quickly creating a large gap between the fuse ends. This, coupled with the expulsion action of the tube, results in the rapid extinction of the arc and interruption of the current flow without the necessity for employing springs for effecting separation of the ends of the ruptured conductor.

In the construction of the fuse element illustrated in Fig. 3, the expulsion tube 24 is not permanently secured to insulation strip 20 by means of rivets as in the construction of Fig. 2, but is held in place by means of a mechanically strong wire 50 of small diameter which is connected in parallel with conductor 23 between rivets 21 and terminal strips 18 and 19. Thus the wire 50 serves to relieve fusible conductor 23 of any strain and supports tube 24 in parallel extending engagement with the intermediate portion of the fuse supporting bracket. With this arrangement, melting of the fusible conductor results in transfer of the current to the strain wire which in turn melts with resultant arc formation and subsequent arc extinction and current interruption in the manner previously described. A strain element in the form of a string may be substituted for the wire 50, in which case the string is burned by the arc on fuse operation. In either case the expulsion tube is freed upon rupture of the strain element and drops away from the bracket so as to provide a longer path through the insulating liquid between the ends of the fused conductor. However, the tube is prevented by means of the walls of mount 30 from dropping down into the transformer windings-and-core assembly.

In the embodiment illustrated in the exploded view of Fig. 4, the fuse element, which is substantially the same as described in connection with the embodiment of Figs. 1 and 2, is not attached directly to the supporting terminal stud and connection terminal stud but has its ends attached respectively, by means of screws 51, to metallic terminal plates 52 and 53 secured respectively at the upper and lower ends of insulting post 54 which, in this embodiment, is constructed of fibrous insulating material. Upper terminal plate 52 carries a connection terminal stud 55 which is adapted to have a lead 41 clamped thereto by means of a "pencil type" clamping nut 56 of suitable insulation material. Lower terminal plate 53 is provided with an opening 57 and radial slots 58 for receiving a bayonet type supporting terminal stud 59 which has a transverse latching pin 60 and which is carried by any suitable form of insulating terminal mount, a part of which is indicated at 61. The lower end of stud 59 is provided with a nut 62 for attachment of a lead 36. Slots 58 and pin 60 provide a detachable bayonet connection for mounting of insulating post 54 on stud 59, and a compression spring 63 is carried by the terminal stud for maintaining locking engagement between pin 60 and terminal plate 53 when post 54 is turned into position for locking of the bayonet connection. Nut 56 serves not only for clamping a lead to upper connection stud 55 but also provides a convenient and safe handle for manipulation of post 54 with the fuse element attached thereto.

The hereinafter described constructions and arrangements of the present invention have, among others, the important advantages that they permit simple connection of line leads to the fused protective device and also provide for convenient location of the device as well as for ready removal and replacement of the device when desired. Also, the insulating supporting structure and the other elements of the apparatus are substantially relieved of damaging or disturbing forces due to the expulsion action because of the employment of an expulsion tube which is open at both ends so as largely to equalize the recoil forces and also because of the employment of a relatively flexible bracket for supporting the expulsion tube. In all of the embodiments illustrated, a part of the terminal mount is interposed between the lower end of the expulsion tube and other elements of the apparatus in the tank so as to deflect expelled products from such other elements, while the upper end of the expulsion tube is arranged to discharge upwardly into the body of insulating liquid above the other elements of the apparatus so that there is no danger of damage or short-circuiting arc-over. The upwardly extending walls of the terminal mount employed in the embodiments of Figs. 1 and 3 serve further to confine the discharge from the lower end of the expulsion tube. In addition to the advantages previously pointed out the constructions and arrangements described are characterized by extreme convenience and simplicity with very low cost.

From the foregoing description, it will be evident to one skilled in the art that my present invention is not limited in all respects to the details of construction and arrangement illustrated and that various modifications and other applications may be made thereof. It is intended therefore that such other modifications and applications as do not depart from the true spirit and scope of the invention shall be covered by the appended claims.

What I claim as new and desire to secure by Letters Patent of the United States, is:

1. In an electric apparatus, the combination of a terminal stud, an insulating post detachably mounted at one end on said stud and having a connection terminal in insulated spaced relation to the stud, a generally U-shaped bracket supported by said post and having end portions including terminal elements connected respectively with said stud and said connection terminal, said bracket having an intermediate portion extending in substantially parallel spaced relation to said post, and a fuse device carried by said bracket and including a conductor electrically connected between said terminal elements and having a fusible section.

2. In an electric apparatus, the combination of an insulating support, a generally U-shaped bracket carried by said support, said bracket having end portions connected to the support in spaced relationship and an intermediate portion extending generally at right angles to said end portions, terminal means associated respectively with opposite ends of said bracket, a conductor carried by said bracket electrically connected between said terminal means and having a fusible section, and an expulsion tube carried by said bracket in surrounding relation to said fusible section and extending substantially parallel with said intermediate portion of the bracket.

3. An electric protective element comprising a generally U-shaped supporting bracket having end sections respectively including conductive terminal elements and having an intermediate section at least partially of insulation, said end sections being adapted for attachment to a supporting structure in spaced relationship and a substantial portion of said intermediate section extending generally at right angles to said end sections, a conductor connected at its ends respectively to said terminal elements and having a fusible section, and an expulsion tube carried by said bracket in surrounding relation to said fusible section and extending substantially parallel to said portion of said intermediate section.

4. An electric protective element comprising a generally U-shaped bracket having electrically conductive end sections adapted for attachment to a support in spaced relationship and having an intermediate insulating section, at least a substantial portion of which intermediate section extends generally at right angles to said end sections, a conductor having its ends mechanically and electrically connected to said end sections and having a fusible section, an expulsion tube, and means carried by said bracket supporting said tube in surrounding relation to said fusible section and in substantially parallel extending relation to said portion of said intermediate section of the bracket.

5. In an electric apparatus including a container having therein a body of insulating liquid and an electric assembly immersed in said liquid, a terminal stud associated with said assembly in said liquid, an insulating post mounted at one end on said stud and having a connection terminal adjacent the other end thereof, bracket means supported by said post and including a pair of spaced apart conducting elements conductively connected respectively with said terminal and said stud, a conductor connected between said elements and having a fusible section, and an expulsion tube carried by said bracket means in surrounding relation to said fusible section and submerged in said liquid.

6. In an electric apparatus including a container having therein a body of insulating liquid and an electric assembly immersed in said liquid, a terminal stud associated with said assembly and submerged in said liquid, an insulating post mounted at one end on said stud and having a connection terminal in insulated spaced relation to the stud, a fuse device including an expulsion tube and a conductor having a fusible section, and means supported by said post for supporting said fuse device submerged in said liquid with said conductor connected between said stud and said terminal and with said tube in surrounding relation to said fusible section.

7. In a transformer including a container having therein a body of insulating liquid and a windings-and-core assembly immersed in said liquid, a terminal board associated with said assembly and immersed in said liquid, a terminal element carried by said board and arranged for connection with a winding of said assembly, an insulating post supported by attachment of one end thereof to said terminal element, a connection terminal carried by said post in insulated spaced relation to said terminal element, a fuse device including an expulsion tube and a conductor having a fusible section, and means supported by said post for supporting said fuse device submerged in said liquid with said conductor connected between said terminal and said supporting terminal element and with said tube in surrounding relation to said fusible section.

8. In an electric apparatus including a container having therein a body of insulating liquid and an electric assembly immersed in said liquid, a terminal mount associated with said assembly in said container, an insulating post supported at one end on said mount, terminal means respectively adjacent opposite ends of said post, and a fuse device supported by said post submerged in said liquid, said fuse device including a conductor electrically connected between said terminal means and having a fusible section and an expulsion tube in surrounding relation to said fusible section.

9. In an electric apparatus including a container having insulating liquid therein and an electric assembly immersed in said liquid, an insulating terminal supporting structure immersed in said liquid, connection means for said assembly including a pair of spaced terminals carried by said structure, a conductor connected between said terminals and including a fusible section, an open ended expulsion tube, and means carried by said structure for supporting said tube in surrounding relation to said fusible section and in a substantially upright position submerged in said liquid, said structure including a bottom wall extending in spaced opposition to the lower end of said tube and side walls extending a substantial distance upwardly around and in spaced relation to said tube.

10. In an electric apparatus including a container having insulating liquid therein and an electric assembly immersed in said liquid, an insulating member immersed in said liquid and having a bottom wall and upwardly extending side walls defining a compartment open at the top and on one side, a substantially upright insulating post mounted at its lower end on said bottom wall and having connection terminal means respectively adjacent the top and bottom thereof, and an electric protective device supported by said post submerged in said liquid and with a substantial part of the device disposed in said compartment, said device including a conductor connected between said terminal means and having a fusible section.

11. In an electric apparatus, the combination of an insulating terminal mount having a bottom wall and upwardly extending side walls defining a compartment open at the top and on one side, a terminal element carried by said bottom wall, a substantially upright insulating post mounted at its lower end on said terminal element and having a connection terminal adjacent the upper end thereof, an electric protective device including a conductor having a fusible section, and means carried by said post for supporting said device with a substantial part of the device disposed in said compartment and with said conductor connected between said connection terminal and said supporting terminal element.

12. In an electric apparatus, the combination of an insulating terminal mount having a bottom wall and upwardly extending side walls defining a compartment open at the top and on one side, a terminal stud carried by said bottom wall, a substantially upright insulating post detachably mounted at its lower end on said stud and having a connection terminal adjacent the upper end thereof, and an electric protective device supported by said post, which said device includes an expulsion tube supported in a substantially upright position with a substantial portion of the tube disposed in said compartment and a conductor electrically connected between said terminal and said stud and having a fusible section in said tube.

SIDNEY R. SMITH.